C. BARKER.
Railway Car Doors.

No. 5,206. Reissued Dec 31, 1872.

Attest;
D. Howe
Alonzo Hughes

Inventor;
Charles Barker
by A.H. & R.K. Evans Attys.

AM. PHOTO-LITHOGRAPHIC CO. N.Y. (OSBORNE'S PROCESS.)

UNITED STATES PATENT OFFICE.

CHARLES BARKER, OF MAQUON, ILLINOIS, ASSIGNOR TO HIMSELF AND THOMAS C. THOMAS, OF SAME PLACE.

IMPROVEMENT IN RAILWAY-CAR DOORS.

Specification forming part of Letters Patent No. 103,126, dated May 17, 1870; antedated May 13, 1870; reissue No. 5,206, dated December 31, 1872.

*To all whom it may concern:*

Be it known that I, CHARLES BARKER, a citizen of Maquon, in the county of Knox and State of Illinois, have invented a new and Improved Door for Box-Cars; and I hereby declare that the following is a full, clear, and exact description thereof, reference being had to the accompanying drawing, in which—

Figure 1:
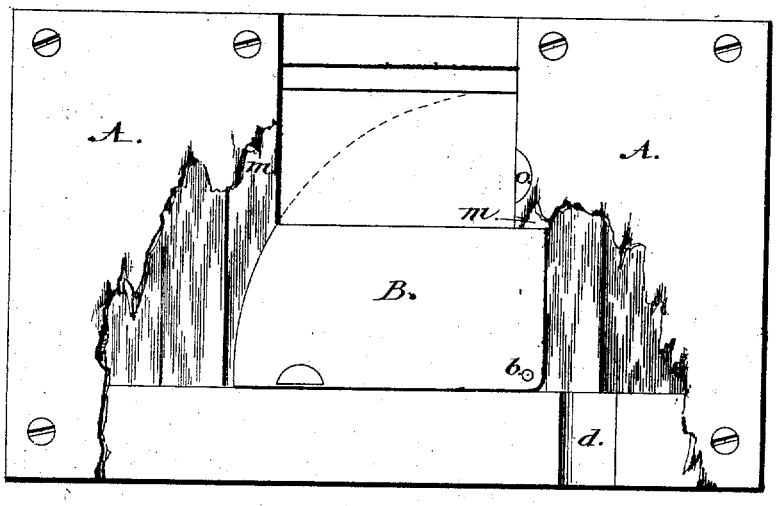
Figure 4:
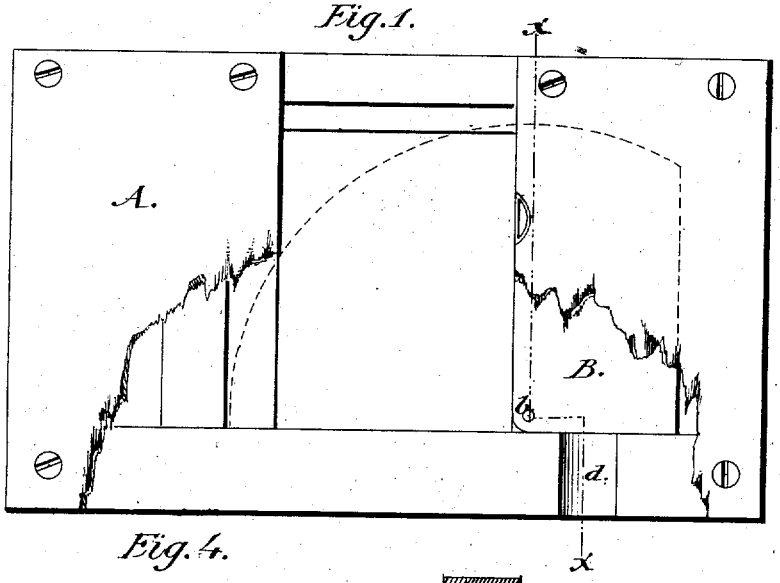
Figure 3:
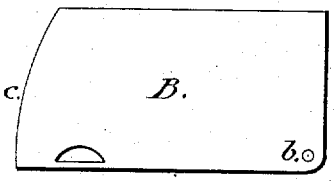
Figure 2:
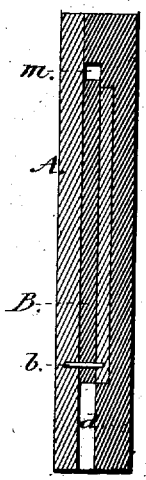

Figure 1 is a front view of my improved door; Fig. 2 is a vertical sectional view through the line *x x;* Fig. 3 is a view of the door detached from the car; and Fig. 4 is a front view of the car-door with my improved door thrown open.

The nature of my invention is, employing a door to obviate the disadvantages of the sliding door generally in use in railway box-cars; and it consists in applying to a box-car a revolving door.

To enable others skilled in the art to make and use my invention, I will now proceed to describe the manner in which I have carried it out.

A is the side of a box-car constructed in the usual way. B is the door, pivoted at *b*, and so inclined at the opposite end *c* that each corner will be an equal distance from the pivot. This peculiar shape enables the door, when partially thrown up, to retain its hold in the groove *m*, and withstand the outward pressure of the grain. When the door of the car is thrown open one edge of the door is brought parallel to the side of the door-frame, as is shown in Fig. 4. When the door B is closed down, as shown in Fig. 1, it fits snugly in the slots or grooves *m m*, so as not to let the grain enter them. The opening *d* in the frame of the car, in rear of the door B, is for the escape of any grain which may enter the opening receiving the door when thrown up, thus securing at all times a free motion of the door. There is a lining completely covering the inside of the section of the car in which the door is placed, and fitting so closely that grain cannot enter the cavities *m* when the door plays.

A semicircular space, *o*, is cut away from the wall of the car, through which to reach the door B when it is open and required to be closed.

Having thus described my invention, what I claim as new, and desire to secure by Letters Patent, is—

1. A revolving door, in combination with a railroad car, substantially as and for the purpose set forth.

2. The revolving door B, when applied to a railroad car, in combination with the opening *d* for the escape of grain or other substances which would prevent the opening of the door, when arranged with reference to each other, as set forth.

3. A revolving door for railroad cars with the outer points of the door equidistant from the pivot on which it turns, as set forth.

4. A revolving door for railroad cars, so constructed that when the door is open one edge of the door shall be parallel to the side of the door-frame, substantially as shown and described.

CHARLES BARKER.

Witnesses:
J. M. SARVIS,
W. H. CLARKE.